United States Patent [19]

Haman et al.

[11] E Patent Number: Re. 32,938

[45] Reissued Date of Patent: Jun. 6, 1989

[54] DUAL FUEL SYSTEM FOR INTERNAL COMBUSTION ENGINE

[75] Inventors: David F. Haman, Waukegan; Dale M. Needham, Zion, both of Ill.

[73] Assignee: Outboard Marine Corporation, Waukegan, Ill.

[21] Appl. No.: 93,122

[22] Filed: Sep. 1, 1987

Related U.S. Patent Documents

Reissue of:

[64] Patent No.: 4,462,346
Issued: Jul. 31, 1984
Appl. No.: 406,446
Filed: Aug. 9, 1982

U.S. Applications:

[63] Continuation of Ser. No. 816,404, Jan. 2, 1986, abandoned.

[51] Int. Cl.[4] ..... F02M 1/16

[52] U.S. Cl. ..... 123/73 B; 123/187.5 R

[58] Field of Search ..... 123/187.5 R, 179 G, 123/179 L, 73 R, 73 A, 73 B, 73 C, 180 R, 73 PP

[56] References Cited

U.S. PATENT DOCUMENTS

| | | | |
|---|---|---|---|
| 752,181 | 2/1904 | Ronan | 123/298 |
| 1,181,122 | 5/1916 | Eastman | 123/180 AC |
| 1,572,701 | 2/1926 | Allec | 123/434 |
| 1,712,465 | 5/1929 | Woolson | 123/557 |
| 2,016,337 | 10/1935 | Mikulasek | 123/434 |
| 2,469,751 | 5/1949 | Sweeney | 128/187.5 R |
| 2,759,716 | 8/1956 | Jones | 261/41 |
| 3,472,211 | 10/1969 | Meininger | 123/73 R |
| 3,515,106 | 6/1970 | Verlinde | 123/180 R |
| 3,805,758 | 4/1974 | May | 123/187.5 R |
| 3,916,851 | 11/1975 | Otani | 123/73 A |
| 3,978,839 | 9/1976 | Dubois et al. | 123/187.5 R |
| 4,309,968 | 1/1982 | DuBois | 123/187.5 R |
| 4,333,425 | 6/1982 | Kusche | 123/73 R |
| 4,375,206 | 3/1983 | Baltz et al. | 123/187.5 R |
| 4,375,795 | 3/1983 | Billingsley | 123/187.5 R |

FOREIGN PATENT DOCUMENTS

| | | | |
|---|---|---|---|
| 29396 | 5/1971 | Australia . | |
| 1072407 | 2/1980 | Canada | 123/187.5 R |
| 51-158921 | 6/1975 | Japan . | |
| 52-124531 | 10/1977 | Japan . | |
| 55-16527 | 6/1980 | Japan . | |
| 55-164747 | 12/1980 | Japan | 123/187.5 R |
| 57-124060 | 8/1982 | Japan . | |
| 1250405 | 10/1971 | United Kingdom . | |
| 1353288 | 5/1974 | United Kingdom . | |
| 2056569 | 3/1981 | United Kingdom . | |
| 2055976 | 3/1983 | United Kingdom . | |

*Primary Examiner*—David A. Okonsky
*Attorney, Agent, or Firm*—Michael, Best & Friedrich

[57] ABSTRACT

Disclosed herein is an internal combustion engine comprising a crankcase, a cylinder extending from the crankcase and having an inlet port, a piston located in the cylinder, a transfer passage located between the crankcase and the cylinder inlet port, a fuel pump adapted to communicate with a source of fuel for normal operation, a carburetor having an air induction passage communicating with the crankcase and including a venturi, which carburetor also includes a float bowl communicating with the fuel pump and a high speed nozzle communicating between the float bowl and the venturi, a low speed fuel nozzle communicating with the transfer passage adjacent the inlet port, and a fuel line communicating between the float bowl and the low speed nozzle and including therein check valve means preventing flow from the transfer passage to the float bowl and permitting flow from the float bowl to the transfer passage, which fuel line also includes fuel flow metering means.

6 Claims, 1 Drawing Sheet

DUAL FUEL SYSTEM FOR INTERNAL COMBUSTION ENGINE

Matter enclosed in heavy brackets [ ] appears in the original patent but forms no part of this reissue specification; matter printed in italics indicates the additions made by reissue.

RELATED APPLICATION

This application is a continuation of application Ser. No. 816,404, filed Jan. 2, 1986, and now abandoned.

BACKGROUND OF THE INVENTION

The invention relates to fuel supply systems for two-stroke internal combustion engines and, particularly, to arrangements for supplying fuel for low speed operations.

The invention also relates to dual fuel engines, i.e. to engines which, in one form or another, operate with a more expensive fuel, such as gasoline, for starting and warm-up and with an inexpensive fuel, such as kerosene, for normal and low speed operation.

Attention is directed to the following U.S. Pat. Nos.: Eastman 1,181,122 Ronan 752,181 Allec 1,572,701 Mikulaske 2,016,337 Ko Verlinde 3,515,106 Kusche 4,333,425

SUMMARY OF THE INVENTION

The invention provides an internal combustion engine comprising a crankcase, a cylinder extending from the crankcase and having an inlet port, a transfer passage communicating between the crankcase and the cylinder inlet port, a source of fuel, a low speed fuel nozzle communicating with the transfer passage adjacent the inlet port, and a fuel line communicating between the source of fuel and the low speed nozzle and including therein check valve means preventing flow from the transfer passage to the fuel source and permitting flow from the fuel source to the transfer passage, which fuel line also include fuel flow metering means.

The invention also provides an internal combustion engine comprising a crankcase, a cylinder extending from the crankcase and having an inlet port, a transfer passage communicating between the crankcase and the inlet port, a carburetor having an air induction passage communicating with the crankcase and including a venturi, and a high speed nozzle communicating between the venturi and a source of fuel for normal operation, a low speed fuel nozzle communicating the transfer passage adjacent the inlet port, and a fuel line communicating between the low speed nozzle and a source of fuel for normal operation and including therein check valve means preventing flow from the combustion chamber and permitting flow to the combustion chamber, which fuel line also includes therein fuel flow metering means.

The invention also provides an internal combustion engine comprising a combustion chamber, a carburetor having an air induction passage communicating with the combustion chamber, a venturi, a float bowl communicating with a source of fuel for normal operation, and a high speed nozzle communicating between the float bowl and the venturi, a low speed fuel nozzle communicating with the combustion chamber, and a fuel line communicating between the float bowl and the low speed nozzle and including therein check valve means preventing flow from the combustion chamber to the float bowl and permitting flow from the float bowl to the combustion chamber, which fuel line also includes therein fuel flow metering means.

In one embodiment in accordance with the invention the internal combustion engine further includes a reservoir for a primer fuel, and a primer fuel pump communicating with the primer fuel reservoir and with the air inducation passage downstream of the throttle valve, which primer fuel pump is manually operable to deliver primer fuel to the air induction passage.

Other features and advantages of the embodiments of the invention will become known by reference to the following general description, claims and appended drawings.

IN THE DRAWINGS

Figure 1:
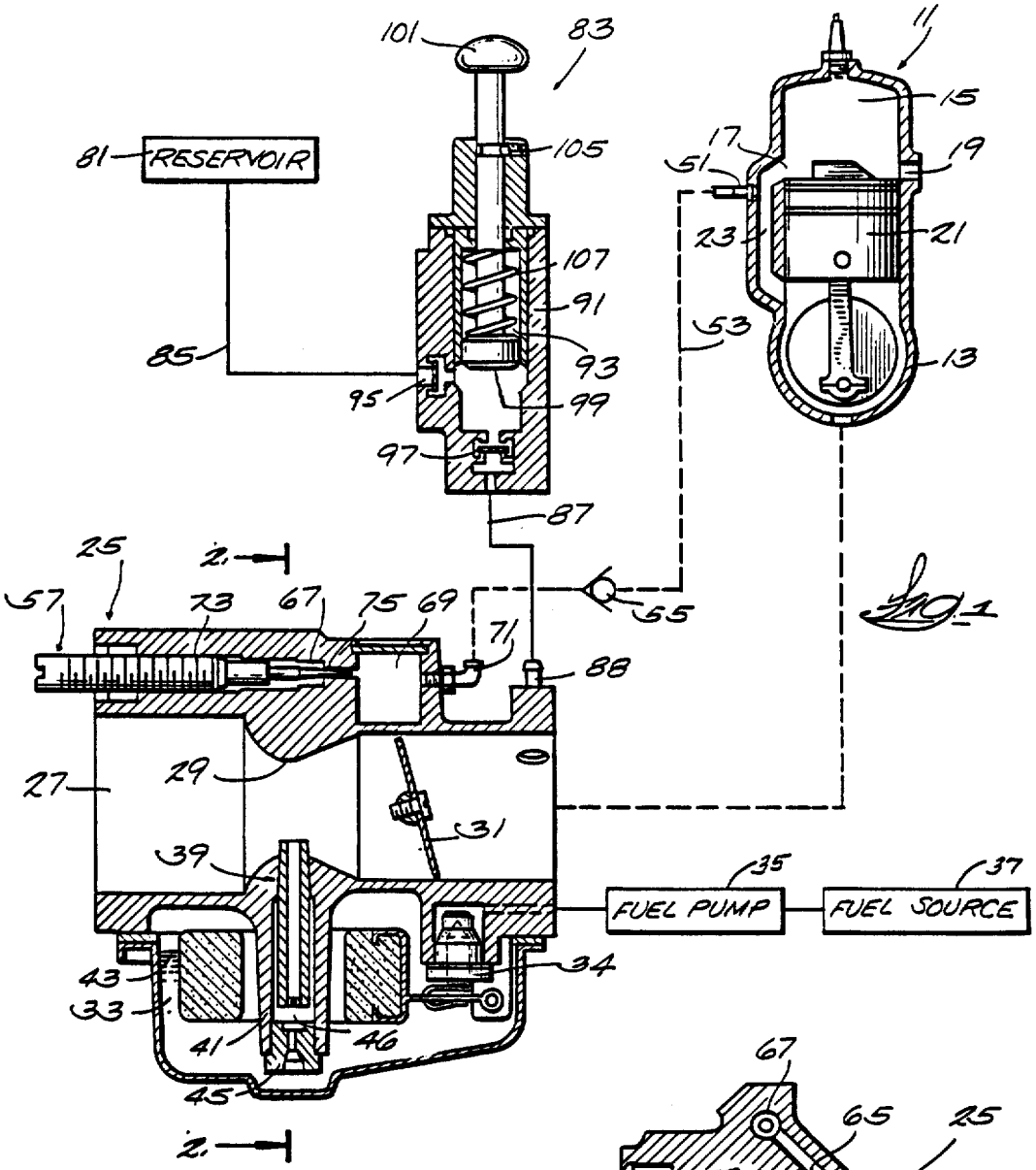
FIG. 1 is a schematic view, partially in cross-section, of an engine fuel feeding system in accordance with the invention.
Figure 2:
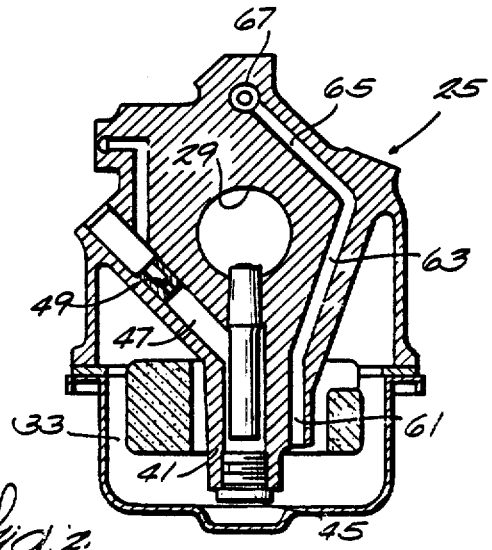
FIG. 2 is a sectional view taken along line 2—2 of FIG. 1.

Before explaining one embodiment of the invention in detail, it is to be understood that the invention is not limited in its application to the details of construction and the arrangement of components set forth in the following description or illustrated in the drawings. The invention is capable of other embodiments and of being practiced and carried out in various ways. Also, it is to be understood that the phraseology and terminology employed herein is for the purpose of description and should not be regarded as limiting.

GENERAL DESCRIPTION

Shown in the drawings is an internal combustion engine 11 which is preferably of the two stroke type and which includes a crankcase 13, together with a cylinder or combustion chamber 15 which extends from the crankcase 13, which includes an inlet port 17 and an outlet or exhaust port 19, and which contains therein a piston 21 movable reciprocally so as to open and close the inlet and outlet ports 17 and 19. The engine 11 also includes a transfer passage 23 extending between the crankcase 13 and the cylinder inlet port 17. Any suitable construction of the foregoing components can be employed.

The engine 11 also includes a carburetor 25 which is mounted on the crankcase 13 and which comprises an air induction passage 27 communicating with the crankcase 13 and including a venturi 29 and, downstream of the venturi 29, i.e., between the venturi 29 and the crankcase 13, a throttle valve 31.

The carburetor 25 also includes a float bowl or reservoir 33 which communicates, subject to the usual float valve 34, with a fuel pump 35 which is preferably driven by the engine 11 and which is adapted to communicate with a suitable source 37 of fuel for normal running operation. Either gasoline or an inexpensive fuel, such as kerosene, can be used. If desired, means other than the fuel pump 35 could be employed to supply fuel to the float bowl or reservoir 33.

Extending between the float bowl or reservoir 33 and the venturi 29 is a high speed nozzle 39. In this regard, the carburetor 25 includes a depending hollow boss 41 which extends into the float bowl or reservoir 33 below the normal liquid level 43. The lower open end of the boss 41 is closed by a high speed orifice plug or part 45. The high speed nozzle 39 extends into the hollow interior of the boss 41 above the plug 43 and includes, at the lower end thereof, a restriction 46. The hollow interior of the boss 41 also communicates with the atmosphere through a bore or duct 47 having therein a restriction 49.

If desired, the high speed nozzle 39 can communicate with a source of fuel other than the carburetor float bowl 33.

Means are also provided for supplying the engine 11 with fuel for low speed operation independently of the air induction passage 27. While various arrangements can be employed, in the illustrated construction, the engine 11 also includes a low speed nozzle 51 which, in the preferred and illustrated construction, extends into the transfer passage 23 adjacent the inlet port 17. As a consequence, the vacuum condition periodically present in the crankcase draws fuel into the transfer passage in the area adjacent the inlet port 17. This fuel is, accordingly, located for immediate conveyance into the cylinder 15 upon opening of the inlet port 17 by the piston.

The low speed nozzle 51 communicates with a source of fuel through a fuel line 53 which includes therein check valve means 55 permitting fuel flow to the cylinder 15 and preventing fuel flow from the cylinder 15. Any suitable check valve construction can be employed. The fuel line 53 also preferably includes fuel flow metering means 57 which can be a restriction but which is preferably adjustable.

While other constructions can be employed, in the illustrated consruction, the fuel source with which the fuel line 53 communicates is the float bowl or reservoir 33. In this connection, the fuel line 53 includes, in the carburetor 25, a series of serially connected ducts or bores 61, 63, 65, and 67 which extend from or communicate with the float bowl or reservoir 33 and which lead to a well 69 which does not communicate with the air induction passage 27. Instead, the well 69 communicates through a fitting 71 with the remainder of the fuel line 53.

While other constructions can be employed, the fuel metering means 57 includes an adjustable needle valve 73 having a tip 75 which is movable relative to the duct 67 to meter flow to the low speed nozzle 51.

Particularly if the source of fuel is an inexpensive fuel, such as kerosene, it is desirable to provide the engine 11 with means for providing primer fuel, such as gasoline, to the cylinder 15 for starting and warm-up purposes. While other various arrangements can be employed, in the illustrated construction, such means comprises a reservoir 81 for the primer fuel, together with a manually operated primer pump 83 which communicates through a conduit 85 with the primer fuel reservoir 81 and through a conduit 87 with a nipple 88 communicating with the air induction passage 27 downstream of the throttle valve 31, i.e. adjacent to the crankcase 13. If desired, the primer pump 83 could communicate through the line or duct 87 directly with the cylinder 15, or with the transfer passage 23, or with the crankcase 13.

If the desired construction, the primer pump 83 includes a housing 91 defining a pumping chamber 93 communicating through inlet and outlet check valves 95 and 97 with the lines or conduits 85 and 87. Movable relative to the pumping chamber 93, is a pumping piston 99 which is connected to an operating knob 101 for actuation by the operator. The pumping piston 99 is movable between an inner position, an outer position, and an intermediate detent position which is determined by a suitable detent mechanism 105, and which is shown in FIG. 1. Any suitable detent mechanism 105 can be employed.

Means in the form of a spring 107 are also provided for biasing the piston 99 from the outer position to the intermediate detent position.

In operation, when starting, withdrawal of the pumping piston 99 to the outer position by the operator, followed by insertion of the pumping piston 99 to the inner position, will supply primer fuel to the air induction passage 27 adjacent to the crankcase 13. As many strokes as is desirable can be applied. Retention of the pumping piston 99 in the inner position serves to prevent flow of primer fuel from the primer fuel reservoir 81 to the cylinder 17. If the pumping piston 99 is retained in the indeterminate position by the detent mechanism 105, engine vacuum in the air induction passage 27 will be effective to draw or suck primer fuel through the primer pump 83 from the primer fuel reservoir 81 so as to enable warming-up operation of the engine. Thereafter, communication between the cylinder 17 with the primer fuel reservoir 81 is discontinued by insertion of the pumping piston 99 to the inner position.

If the throttle valve 31 is set at low speed, after the engine has been warmed-up as just indicated, engine vacuum will draw or suck fuel through the low speed nozzle 51. The extent of the engine vacuum occurring at such low speed will be ineffective to suck or draw fuel from the main or high speed nozzle 39 and thus, at low engine speed with the primer pump 83 closed, only air will be fed through the air induction tube or passage 27.

However, when the throttle valve 31 is moved to an advanced setting, increased engine vacuum will cause fuel to be drawn or sucked from the high speed nozzle 39. Thus, at high speeds, the high speed nozzle 39, as well as the low speed nozzle 51, supply fuel to the engine 11.

There is thus provided an engine in which, under low speed conditions, fuel (in the absence of air) is delivered directly to the transfer passage adjacent the inlet port so as thereby to provide for effective conveyance into the combustion chamber in a manner reducing the possibility of fuel accumulation during low speed operation in the crankcase. In addition, there is provided a dual fuel engine which can be started on gasoline, or other relatively expensive fuel, and, after warm-up, if necessary, can be run at low or high speeds on a less expensive fuel, such as kerosene.

While the invention has been described with respect to a single cylinder 15, the invention is also applicable to multi-cylinder engines, and the fuel line 53 can be provided with one or more additional branch lines to serve one or more additional cylinders.

Various of the features of the invention are set forth in the following claims:

We claim:

1. An internal combustion engine comprising a crankcase, a cylinder extending from said crankcase and defining a combustion chamber having an inlet port, a transfer passage communicating between said crankcase and said inlet port, a carburetor having an air induction passage communicating with said crankcase and including a venturi *and a float bowl adapted to contain fuel for normal operation,* a throttle valve intermediate said venturi and said crankcase. and a high speed nozzle communicating between said venturi and [a source of operating fuel for normal operation] *said float bowl, a low speed*

*fuel nozzle communicating with said transfer passage adjacent said inlet port, a fuel line communicating between said low speed nozzle and said* [source of operating fuel]*float bowl for delivering fuel unmixed with air from said float bowl through said low speed nozzle to said transfer passage, said fuel line including check valve means for preventing flow from said combustion chamber and permitting flow to said combustion chamber and also including fuel flow metering means separate from said check valve means, a reservoir for a primer fuel different from said operating fuel, and a primer fuel pump communicating with said primer fuel reservoir and with one of said induction passage, said crankcase, said transfer passage and said combustion chamber, said primer fuel pump being manually operable to deliver primer fuel to said one of said induction passage, said crankcase, said transfer passage, and said combustion chamber.*

2. An internal combustion engine according to claim 1 wherein said low speed nozzle extends into said transfer passage adjacent said inlet port.

[3. An internal combustion engine according to claim 1 wherein said source of operating fuel comprises a float bowl and wherein said fuel line communicates with said float bowl.]

4. An internal combustion engine according to claim 1 wherein said operating fuel is less [volatile] than said primer fuel.

5. An internal combustion engine according to claim 4 wherein said operating fuel is kerosene and said primer fuel is gasoline.

6. An internal combustion engine in accordance with claim 1 wherein said primer fuel pump communicates with said induction passage intermediate said throttle e valve and said crankcase.

*7. An internal combustion engine comprising a crankcase, a cylinder extending from said crankcase and defining a combustion chamber having an inlet port, a transfer passage communicating between said crankcase and said inlet port, a carburetor having an air induction passage communicating with said crankcase and including a venturi and a float bowl adapted to contain fuel for normal operation, a high speed fuel nozzle communicating between said venturi and said float bowl, a low speed fuel nozzle communicating with said transfer passage adjacent said inlet port, a fuel line communicating between said low speed nozzle and said float bowl for delivering fuel unmixed with air from said float bowl through said low speed nozzle to said transfer passage, said fuel line including check valve means for preventing flow from said combustion chamber and permitting flow to said combustion chamber and also including fuel flow metering means separate from said check valve means, a reservoir for a primer fuel different from the operating fuel, and a primer fuel pump communicating with said primer fuel reservoir and delivering primer fuel to one of said air induction passage, said crankcase, said transfer passage, and said combustion chamber, said primer fuel pump being manually operable.*

* * * * *